United States Patent [19]

Suzuki et al.

[11] 4,452,699
[45] Jun. 5, 1984

[54] METHOD OF IMPROVING THE SVI OF MIXED LIQUOR IN AERATION TANK

[75] Inventors: Akira Suzuki, Kasukabe; Yasumi Shioya, Tokyo; Keiichi Kimura, Tsuchiura, all of Japan

[73] Assignee: Shinryo Air Conditioning Co., Ltd., Tokyo, Japan

[21] Appl. No.: 372,802

[22] Filed: Apr. 28, 1982

[30] Foreign Application Priority Data

May 7, 1981 [JP] Japan .................................. 56-68760
Mar. 29, 1982 [JP] Japan .................................. 57-50489

[51] Int. Cl.³ .............................................. C02F 3/12
[52] U.S. Cl. .................................... 210/608; 210/622; 210/625; 210/631
[58] Field of Search ............... 210/608, 609, 625, 623, 210/624, 628, 703–705, 220–221.2, 631, 626, 627

[56] References Cited

U.S. PATENT DOCUMENTS

| | | | |
|---|---|---|---|
| 3,787,316 | 1/1974 | Brink et al. | 210/609 |
| 3,959,124 | 5/1976 | Tchobanoglous | 210/625 |
| 4,082,671 | 4/1978 | Kelly | 210/221.2 |
| 4,267,050 | 5/1981 | Conway et al. | 210/608 |
| 4,341,632 | 7/1982 | Gregor et al. | 210/608 |

FOREIGN PATENT DOCUMENTS

| | | | |
|---|---|---|---|
| 2125141 | 11/1972 | Fed. Rep. of Germany | 210/608 |
| 2433375 | 1/1976 | Fed. Rep. of Germany | 210/609 |
| 53-42451 | 4/1978 | Japan | 210/609 |
| 54-144761 | 11/1979 | Japan | 210/625 |

*Primary Examiner*—Benoît Castel
*Attorney, Agent, or Firm*—Oblon, Fisher, Spivak, McClelland & Maier

[57] ABSTRACT

In the treatment of wastewater by the activated sludge process, mixed liquor in the aeration tank or settled sludge is drawn from the system and concentrated. The concentrated sludge is returned to the aeration tank either immediately or after being mixed with separated water and settled sludge to thereby reduce the SVI of the mixed liquor in the aeration tank.

7 Claims, 3 Drawing Figures

METHOD OF IMPROVING THE SVI OF MIXED LIQUOR IN AERATION TANK

BACKGROUND OF THE INVENTION

The present invention relates to a method of improving the sludge volume index (SVI) of mixed liquor in the aeration tank of an activated sludge plant.

Wastewater such as sewage that contains organic matter is conventionally treated by the activated sludge process. The activated sludge plant basically consists of an aeration tank and a sedimentation tank, and the wastewater is first supplied to the aeration tank. The aeration tank contains several thousand ppm of suspended solid populated by microorganisms that oxidatively decompose the organic matter in the wastewater to carbon dioxide and water. The effluent from the aeration tank is subjected to solid-liquid separation in the sedimentation tank and the supernatant is either discharged into water courses or recycled for further use. Part of the settled sludge is returned to the aeration tank and the remaining sludge is discharged from the plant as excess sludge. While the activated sludge plant is operated in this manner, sludge bulking sometimes occurs in the sedimentation tank. If sludge bulking occurs, the solids content of the settled sludge drawn from the sedimentation tank is decreased and the content of the solids in the aeration tank is also decreased to make the process operation difficult due to overload. What is more, part of the sludge overflows the sedimentation tank to impair the quality of the purified water.

The causes of the sludge bulking have not been fully unravelled, but it is generally ascribed to poor coagulation of the sludge due to increased growth of filamentous organisms such as Sphaerotilus, and to the swelling of bacteria in the sludge due to bound water. An overload on the aeration tank due to increased concentration of the organic matter in the wastewater or increased volume of the water flowing into the aeration tank is said to cause the increased growth of filamentous organisms, hence sludge bulking. Other factors considered responsible for sludge bulking are increased hydrogen sulfide, unbalanced nutrient salts and insufficient aeration.

Sludge bulking is conventionally prevented by supplying more air into the aeration tank or by providing a detention reservoir before the aeration tank to make the load on the aeration tank uniform over time. If these methods prove to be ineffective, sterilizers such as chlorine, copper compounds, ozone and chloroform to kill filamentous organisms are added to the aeration tank or the returned sludge, or a flocculation agent is added to coagulate the sludge.

Since sludge bulking is an unpredictable phenomenon addition of the sterilizer or flocculation agent must be done continuously to completely prevent the phenomenon. But to add these chemicals over an extended period of time results in an increased operation cost. As a further disadvantage, the sterilizer kills not only the filamentous organisms but also the other microorganisms in the system, so if it is added in excess, the activity of the microorganisms is decreased and the quality of the purified water impaired.

Japanese Patent Application No. 164236/79 discloses a method without a sedimentation tank wherein a cationic polymeric flocculation agent is added to the effluent from the step of biologically oxidizing organic wastewater, the effluent is dewatered by centrifuge the dewatered cake is mixed with another effluent from the biological oxidation step to form a slurry, which is returned to the aeration tank. Japanese Patent Application No. 72485/80 discloses a method wherein an oxidizer and inorganic flocculation agent are added to concentrated excess sludge, the sludge is dewatered by a filter press, the separated water is recycled for use as a flocculation agent in a coagulation/sedimentation step before or after the biological treatment step. Wlb-wasser luft und betrieb-22 (1978) Nr 10, pp. 530–533 discloses a method that improves the settleability of swollen sludge by shredding it with a centrifuge. The first and third methods that rely on concentration by centrifugal force are effective in increasing the solids content of sludge, but at the same time, they have negative effects on floc formation since they cut the sludge into shreds. In addition, the first method intends a biological treatement with the step of gravitational settlement whereas the present invention aims at improved SVI by separating the sludge through gravitational settlement. The second reference teaches only a method of reusing the flocculation agent in the water separated from the concentrated excess sludge. Therefore, none of these references disclose a technique of the type comtemplated by the present invention that achieves improved SVI by increasing the ability of the particles of the sludge to coagulate and form flocs of high density, as well as by increasing the dispersibility of the concentrated sludge in the aeration tank.

SUMMARY OF THE INVENTION

The present invention relates to a new process for preventing sludge bulking. The process comprises directing mixed liquor in the aeration tank or settled sludge into a concentration line which is out of line with the activated sludge system, concentrating the sludge to improve its physical properties, then returning the sludge to the aeration tank to thereby reduce the SVI of the mixed liquor in a short period of time.

DETAILED DESCRIPTION OF THE INVENTION

Figure 1:
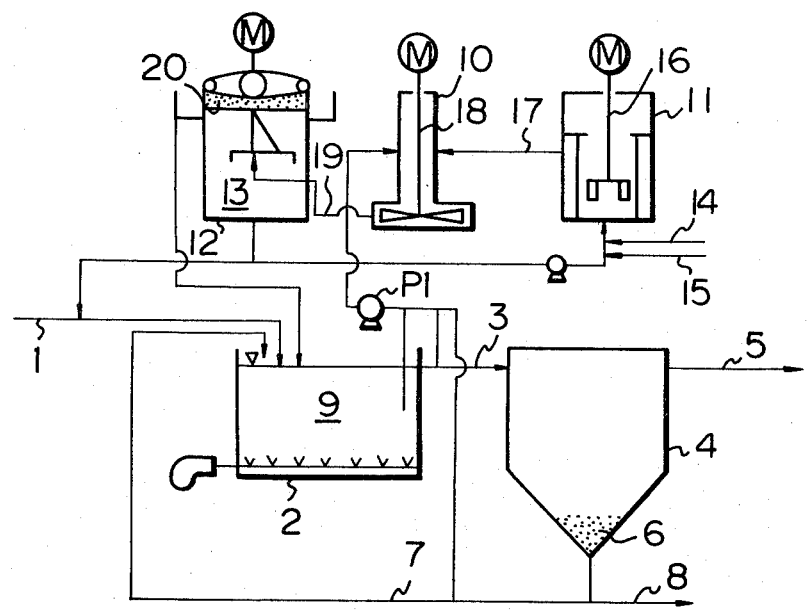
FIG. 1 is a schematic diagram for the method of the present invention according to one embodiment.

The present invention eliminates the defects of the prior art activated sludge process and provides a method for improving the SVI of mixed liquor in the aeration tank and preventing sludge bulking with the use of a small amount of chemical.

The present invention relates to a method for improving the SVI of mixed liquor in the aeration tank of an activated sludge plant which includes said aeration tank and a sedimentation tank, wherein at least one of the mixed liquor in the aeration tank, mixed liquor drawn from a line connecting the aeration tank to the sedimentation tank and settled sludge flowing out of the sedimentation tank, is directed to a concentration line which is out of line with the activated sludge plant, the concentrated sludge flowing out of the concentration line and having a higher solids content or both said sludge and the separated water having a lower solids content and also flowing out of the concentration line being returned to the aeration tank.

In one embodiment of the method of the present invention, the concentrated sludge flowing out of the concentration line and having a higher solids content or both said sludge and the separated water having a lower solids content and also flowing out of the concentration line, as well as at least one of the settled sludge, mixed liquor in the aeration tank and mixed liquor drawn from a line connecting the aeration tank to the sedimentation tank are directed to a mixing tank, and at least part of the mixed sludge flowing out of the mixing tank is returned to the aeration tank.

As a result of extensive experimental work in search for a method to improve the settleability of sludge in which bulking has occurred, the present inventors have found that sludge with a solids content of 4% by weight or more that is obtained by concentrating mixed liquor in the aeration tank or settled sludge is more settleable than before it was concentrated even if it is diluted and dispersed into fine particles. The present invention has been accomplished on the basis of this finding.

One example of the concentration line that can be used in the present invention is an atmospheric flotation concentrator. This equipment includes a foaming unit for blowing air under atmospheric pressure into a liquid phase containing a coagulant and a foaming agent, a mixing unit for mixing the bubbles formed in the foaming unit with at least one of the mixed liquor in the aeration tank, mixed liquor drawn from a line connecting the aeration tank to the sedimentation tank and settled sludge flowing out of the sedimentation tank, and a flotation tank for separating the mixture into concentrated sludge and water. The content of the solids in the mixed liquor or settled sludge is increased as they are adsorbed on the bubbles which go up in the flotation tank. Commonly employed organic coagulants may be used in the present invention, and cationic polymeric flocculants are preferred. The coagulant achieves its intended effect if it is added in an amount of 10 to 20 ppm, and this amount can be reduced further if the sludge is highly sensitive to concentration by flotation. Common surfactants can be used as the foaming agent, but since the foaming agent flows into the aeration tank together with the concentrated sludge that is returned to the aeration tank, a biodegradable foaming agent, for example, a surfactant whose predominant component is a straight hydrocarbon group is preferred. The amount of the foaming agent to be used varies with its type, but an addition of about 10 to 20 ppm usually serves the purpose. The preferred degree of concentration is such that at least 5% of the total solids in the mixed liquor in the aeration tank is concentrated. The concentrated sludge may be returned to the aeration tank in small amounts over an extended period until the above defined degree of concentration is reached, or it may be returned in a shorter period. The concentrated sludge preferably has a solids content of 4% or more.

In another embodiment of the concentration line, the atmospheric flotation concentrator may be combined with a roll press type dehydrator. The roll press type dehydrator is well known to those skilled in the art and its basic components are pressure rollers and two endless belts of filter cloth. The sludge is pinched between the two travelling endless belts of filter cloth and squeezed by pressure rollers that are forced against the filter cloth. The separated water penetrates the filter cloth and is withdrawn from the bottom of the dehydrator whereas the concentrated sludge travels with the endless belts toward their discharge end at which is leaves from the belts.

The most preferred concentration line for the purpose of the present invention is the combination of the atmospheric flotation concentrator and roll press type dehydrator. The sludge to be treated is first concentrated by the atmospheric flotation concentrator which generally is able to keep providing concentrated sludge having a solids content of 6 to 8% by weight. The so concentrated sludge is further concentrated by the roll press type dehydrator. The solids content of the concentrated sludge obtained by the roll press type dehydrator can be varied by properly controlling the pressure applied by the pressure rollers. Even if sludges with different degrees of concentration are diluted to the same solids content, the properties of the resulting dilutions vary from sludge to sludge, and the higher the solids content, the lower the SVI of the sludge. However, in the experiment conducted by the present inventors, if highly concentrated sludge was directly returned to the aeration tank, it was not uniformly dispersed in the tank and the SVI of the sludge was not decreased satisfactorily. On the other hand, if concentrated sludge was returned to the aeration tank after it was diluted uniformly, the sludge became highly dispersible and its SVI was satisfactorily reduced. If too much pressure is exerted by the pressure rollers of the dehydrator, the resulting concentrated sludge forms a cake-like material that does not flow easily and it is difficult to disperse such sludge uniformly in the mixing tank even if it is diluted. Therefore, for the purpose of the present invention, it is preferred to produce a somewhat fluid concentrated sludge, and sludge concentrated to a solids content of 8 to 12% by weight is particularly preferred.

Centrifugal separation with a high-speed impeller that is commonly used to dewater activated sludge is not suitable for use in the present invention because it shreds the sludge and has negative effects on floc formation, although it is capable of increasing the solids content of the sludge.

The mixing tank may use a mechanical stirrer that achieves several to several hundred rpm, preferably 10 to 200 rpm, and a tank capacity that is capable of providing a retention time of several minutes to several hours, preferably from 5 to 30 minutes will serve the purpose. The mixing tank is fed with 2 to 50%, preferably 5 to 20% by volume of settled sludge on the basis of the volume of the settled sludge drawn from the sedimentation tank. The volume ratio of the settled sludge fed to the mixing tank to the separated water is generally in the range of from 10:1 to 1:1, preferably from 5:1 to 2:1.

The present invention does not intend to use the coagulant "in excess" in the atmospheric flotation concentrator. The term "in excess" here used means that the coagulant is used in an amount more than necessary to concentrate the settled sludge or mixed liquor by atmospheric flotation. If the coagulant is used in excess, the unreacted coagulant remains in the separated water. Mixing such separated water with the returned sludge has the same effect as that of adding the coagulant to the returned sludge, and the sludge coagulates naturally, but such embodiment is not included in the scope of the present invention. According to the present invention, the unreacted coagulant in the separated water, as well as the unreacted and reacted coagulants in the concentrated sludge are used effectively under such conditions that a proper amount of coagulant is used in the atmospheric flotation concentrator.

The method of the present invention is hereunder described in more detail by reference to the accompanying drawings.

FIG. 1 is a schematic diagram of a system using one embodiment of the method of the present invention, which includea an aeration tank 2, a sedimentation tank 4, a mixing unit 10, a foaming unit 11 and a flotation tank 12. Mixed liquor 9 in the aeration tank 2 is fed to the mixing unit 10 by a pump P1. The foaming unit 11 is fed with separated water 13 from the floatation tank 12, a chemical 14 including a foaming agent and a coagulant and air 15. The foaming unit 11 has a stirrer 16 in its interior that causes vigorous mixing of the separated water 13, chemical 14 and air 15. The bubbles 17 formed in the foaming unit 11 are fed to the mixing unit 10, wherein the bubbles are mixed uniformly with the mixed liquor 9 by the stirrer 18 and thereafter, the mixture 19 is fed to the flotation tank 12 wherein it is separated into concentated sludge 20 and water 13. The concentrated sludge 20 is returned to the aeration tank 2.

Figure 2:
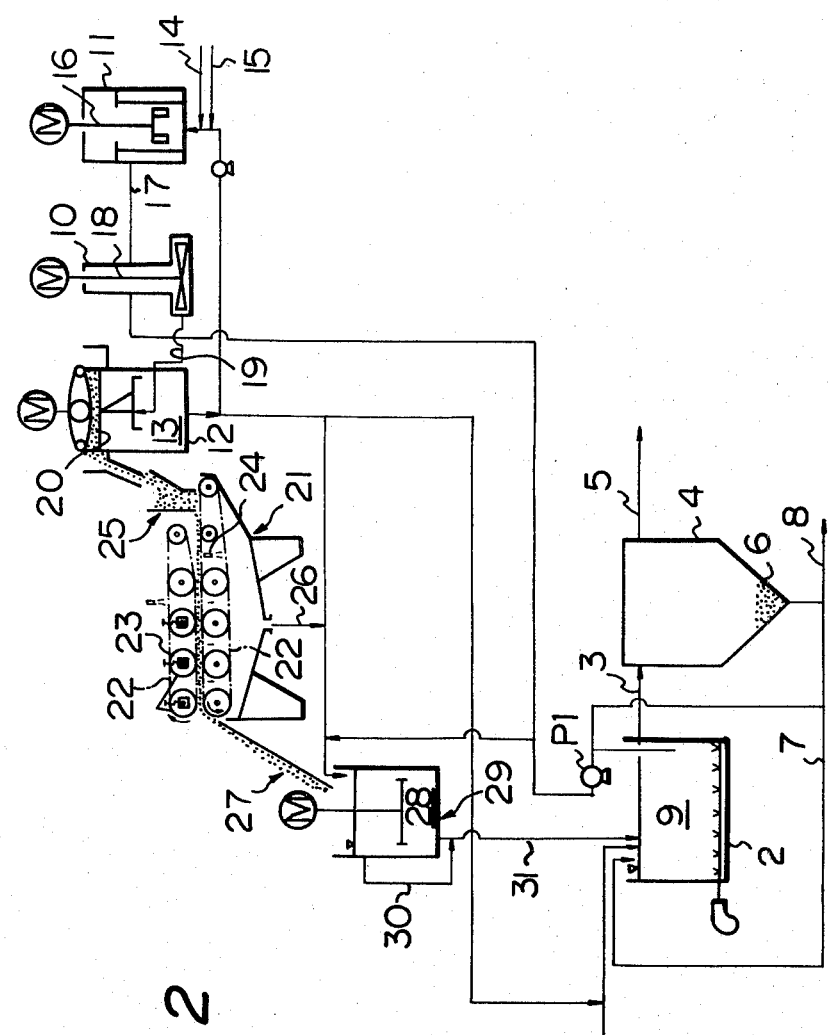
FIG. 2 is a schematic diagram showing another embodiment of the method of the present invention.

FIG. 2 is a schematic diagram of a system using another embodiment of the method of the present invention, which includes an aeration tank 2, a sedimentation tank 4, a mixing unit 10, a foaming unit 11, a flotation tank 12, a roll press type dehydrator 21 and a mixing tank 29. Mixed liquor 9 in the aeration tank 2 is fed to the mixing unit 10 by means of a pump P1. The foaming unit 11 is fed with separated water 13 from the flotation tank 12, a chemical 14 including a foaming agent and a coagulant and air 15. The foaming unit 11 has a stirrer 16 in the interior that causes vigorous mixing of the separated water 13, chemical 14 and air 15. The bubbles 17 formed in the foaming unit 11 are fed to the mixing unit 10 wherein they are mixed uniformly with the mixed liquor 9 by a stirrer 18, and thereafter, the mixture is fed to the flotation tank 12 where it is separated into concentrated sludge 20 and water 13 which is further supplied to the mixing tank 29. Part of the separated water 13 may be returned to the aeration tank 2 together with the raw water supplied through a pipe line 1. Part of the concentrated sludge 20 is supplied to a hopper 25. The remaining part of the concentrated sludge 20 may be supplied to the aeration tank 2. The concentrated sludge fed to the hopper 25 is held between two travelling belts 22 of filter cloth and squeezed by pressure rollers 23. The squeezed sludge 27, separated water 26, 13 and the settled sludge 6 are mixed in the mixing tank 29. The mixed sludge 28 is returned to the aeration tank 2 through a pipe line 31.

The sludge volume index (SVI) is generally used as a guide figure for the settleability of mixed liquor in the aeration tank, and the index is represented as follows:

$$SVI \text{ (ml/g)} = \frac{\text{the volume (ml) of sludge settled from 1000-ml sample in 30 min.}}{\text{the solids content (g) of 1000-ml sludge}}$$

Sludge having high settleability generally has a SVI of from 50 to 100, but sludge in which bulking has occurred has a SVI of 200 to 400.

The method of the present invention is now described more specifically by reference to the following experiments and examples, wherein the settleability of sludge was evaluated in terms of its SVI value.

Experiment 1

The following experiment was conducted at a wastewater treatment plant in a certain city in Japan. The mixed liquor in an aeration tank had a solids content of 3500 ppm and the sludge in the mixed liquor has a SVI of 300. Mixed liquor drawn off the aeration tank was mixed with the fine bubbles produced by blowing air at a rate of 6 liters/min into a liquid phase containing a cationic polymeric flocculant and a surfactant having a straight hydrocarbon group. The flocculant and surfactant were used in amounts of 20 ppm and 15 ppm, respectively, on the basis of the drawn mixed liquor. Concentrated sludge floated and had a solids content of 4% by weight. Eighty-eight milliliters of the concentrated sludge was put in a 1000-ml measuring cylinder, and its mixture with 912 ml of tap water was aerated with air supplied at a rate of 1000 ml/min for one hour. The mixture had a SVI of 65. Thirty milliliters of the same concentrated sludge was put in a 1000-ml measuring cylinder and its mixture with 970 ml of the mixed liquor in the aeration tank was subjected to the same experiment; the resulting mixture had a SVI of 105. Obviously, if sludge in which bulking occurred is concentrated to a solids content of 4% by weight, it remains highly settleable even after it is diluted or dispersed. Furthermore, the concentrated sludge is capable of improving the settleability of sludge in which bulking has occurred.

In the activated sludge process, bulking takes place in settled sludge in the sedimentation tank although it is concentrated. Such sludge has a solids content of about 1% by weight. In the above experiment, sludge having a solids content of 4% by weight was formed by flotation separation. This fact shows that highly concentrating the sludge in which bulking has occurred is greatly effective in improving its settleability.

Experiment 2

Six liters of mixed liquor in an aeration tank having a SVI of 146 ml/g and an MLSS of 1440 mg/l was thoroughly mixed with 60 g and 40 g of sludge samples that had been concentrated to solids contents of 4.0% and 6.0% by weight, respectively, in an atmospheric flotation concentrator, and the SVI of each mixture was measured.

Three samples each weighing 40 g of the concentrated sludge with a solids content of 6.0% by weight were concentrated by a roll press type dehydrator wherein they were squeezed into sludge compositions with solids contents of 8.0%, 10.0% and 12.0% by weight, respectively. Each sludge was mixed with the mixed liquor in the aeration tank and its SVI was measured. In the five cases, the solids content of the concentrated sludge mixed with the mixed liquor was 22% by weight on the basis of the total solids content of that mixed liquor. The results are shown in Table 1 below.

TABLE 1

| Solids content of concentrated sludge (wt %) | SVI (ml/g) |
| --- | --- |
| 4.0 | 117 |
| 6.0 | 105 |
| 8.0 | 92 |
| 10.0 | 87 |

TABLE 1-continued

| Solids content of concentrated sludge (wt %) | SVI (ml/g) |
|---|---|
| 12.0 | 85 |

As the table shows, when concentrated sludge samples containing equal weights of solids were added to mixed liquor samples from the aeration tank having equal volumes, the higher the solids content of the concentrated sludge, the lower the SVI of the mixed liquor.

Experiment 3

The mixed liquor in an aeration tank of a wastewater treatment plant in a certain city in Japan had a solids content of 3579 to 4118 ppm, and a SVI of 300. The mixed liquor was mixed with the fine bubbles formed by blowing air at a rate of 6 liters/min into a liquid phase containing a cationic polymeric flocculant and a surfactant having a straight hydrocarbon group. The mixture was left to stand for 10 minutes to obtain concentrated sludge having a solids content of 4% by weight. The flocculant and the surfactant were used in amounts of 20 ppm and 15 ppm on the basis of the drawn mixed liquor. A hundred and fifty milliliters of the concentrated sludge was added to 5.95 liters of the mixed liquor, and the mixture was aerated with air supplied at a rate of 1000 milliliters per minute for one hour. The so treated mixture had a SVI of 120.

Concentrated sludge was prepared by the same method and under the same conditions as used above, and it was further concentrated by a roll press type dehydrator to a solids content of 10% by weight. Sixty milliliters of the concentrated sludge, 750 ml of returned sludge with a solids content of 1% by weight and 540 ml of separated water with a solids content of 20 ppm were mixed, and 1350 ml of the mixed sludge (solids cont. 1% by weight) was added to 4.75 liters of the mixed liquor from the aeration tank, and the mixture was aerated as above to produce sludge having a SVI of 84.

EXAMPLE 1

An aeration tank of a wastewater treatment plant in a certain city in Japan had a capacity of 400 m$^3$ and the mixed liquor in the tank had a solids content of 3500 ppm. The mixed liquor was pumped from the aeration tank at a rate of 1 m$^3$/hr by the method shown in FIG. 1 and the sludge was subjected to atmospheric flotation concentration using 14 ppm of a cationic polymeric flocculant and 15 ppm of a foaming agent. The rate of air supplied to the foaming unit 11 was 6.7 liters/min and the stirrers 16 and 18 were operated at 1000 rpm and 275 rpm, respectively. The concentrated sludge 20 formed in the flotation tank 12 had a solids content of 5% by weight and all of that sludge was returned to the aeration tank 2.

Mixed liquor having a SVI of 300 was subjected to the above procedure for 120 hours until its solids content was increased up to 30% by weight on the basis of the solids content of the sludge in the aeration tank, and the values of SVI for solids contents of 10, 20 and 30% by weight were measured. The results are shown in Table 2 below. Mixed liquor having a SVI of 200 was also subjected to the same procedure for 80 hours until its solids content was increased up to 20% by weight on the basis of the solids content of the sludge in the aeration tank, and the values of SVI for solids contents of 5, 10 and 20% by weight were measured. The results are shown in Table 3 below.

TABLE 2

| Solids content (wt %) of concentrated sludge on the basis of the solids content of sludge in aeration tank | SVI (ml/g) |
|---|---|
| 0 | 300 |
| 10 | 160 |
| 20 | 110 |
| 30 | 75 |

TABLE 3

| Solids content (wt %) of concentrated sludge on the basis of the solids content of sludge in aeration tank | SVI (ml/g) |
|---|---|
| 0 | 200 |
| 5 | 140 |
| 10 | 100 |
| 20 | 75 |

As the table shows, mixed liquors with SVI values of 200 and 300, respectively, have their SVI decreased remarkably if the solids content of concentrated sludge becomes 5 and 10% by weight on the basis of the total solids content of sludge in the aeration tank. If the solids content is increased further to 20 or 30% by weight, the SVI becomes lower than 100 and the mixed liquors are entirely free from bulking. Therefore, if the mixed liquor in the aeration tank has a SVI of about 300, concentrating the sludge to a solids content of 30% by weight is sufficient to prevent sludge bulking.

The method of the present invention was compared with a conventional method for the amount of coagulant to be used. The conventional method was as follows: when 50 ppm of a cationic polymeric flocculant was added to 1 m$^3$ of mixed liquor in an aeration tank (400 m$^3$) with a solids content of 4000 ppm and a SVI of 250, the SVI of the mixed liquor was lowered temporarily to 205, and to 130 when 100 ppm of the flocculant was added. The amount of the flocculant necessary to reduce the SVI of the mixed liquor down to 130 is calculated as 400 m$^3$×0.1 kg/m$^3$=40 kg. On the other hand, the amount of the flocculant necessary to reduce the SVI of the mixed liquor in the aeration tank in Example 1 of the present invention from 300 to 110 is calculated as 400 m$^3$×0.014 Kg/m$^3$×0.2=1.12 kg, which is only 2.8% of the amount necessary in the conventional method.

EXAMPLE 2

Figure 3:
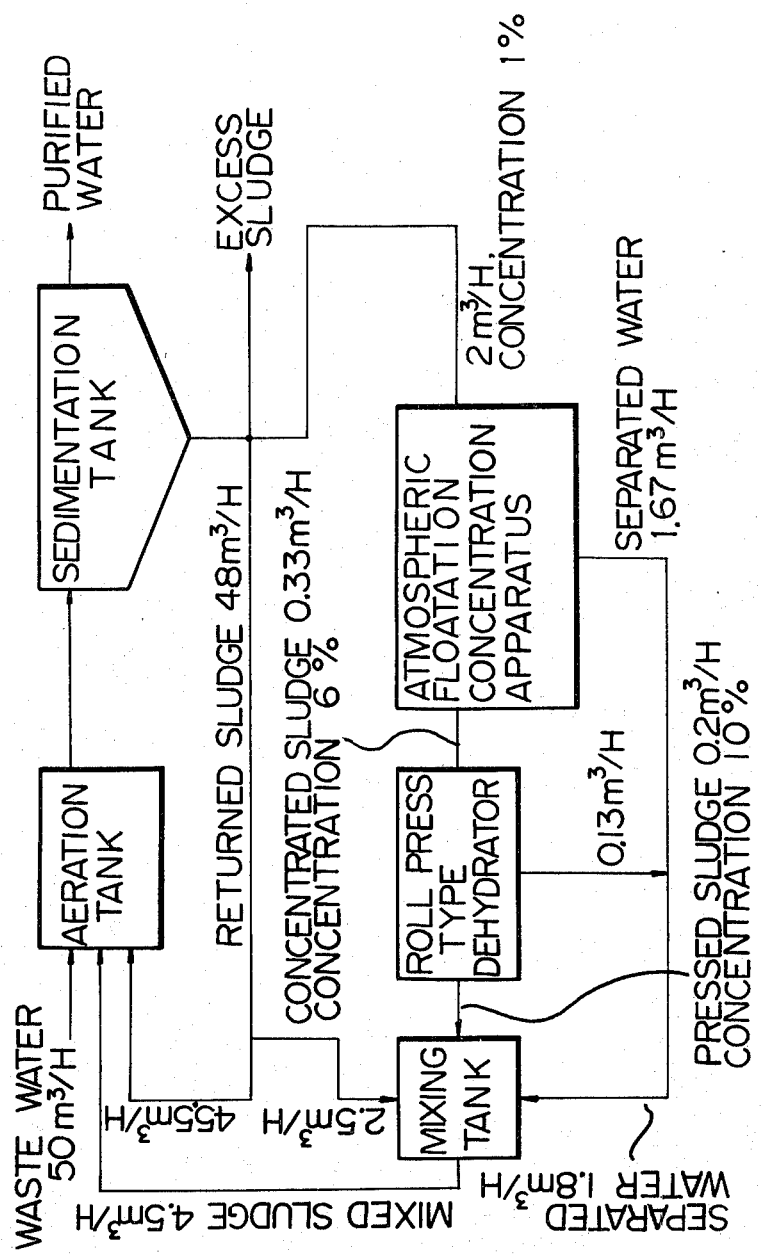
FIG. 3 is a flowsheet showing the method of Example 2 of the present invention.

The quality of the sludge used in an activated sludge plant (capacity: 50 m$^3$/hr) was improved by the method of the present invention. A general flowsheet of the plant is shown in FIG. 3. Of the settled sludge flowing out of the sedimentation tank at a rate of 50 m$^3$/hr, 48 m$^3$/hr of the sludge was returned to the aeration tank, and the remaining 2 m$^3$/hr was directed to the concentration unit which consisted of an atmospheric flotation concentrator of the type illustrated in FIG. 1. A coagulant and a foaming agent were added to the settled sludge in an equal amount of 15 ppm. In the concentrator, the sludge was separated into concentrated sludge having a solids content of 6.0% by weight and water having a solids content of 0.002% by weight. The concentrated sludge was further concentrated to a solids content of 10.0% by weight by means of a roll press type dehydrator. The so concentrated sludge (0.2 m³/hr), separated water (1.8 m³/hr) and settled sludge (2.5 m³/hr) were supplied to a 0.4 m³ mixing tank with a stirrer. All of the mixed sludge was returned to the aeration tank. These procedures were continuously carried out for 200 hours and the SVI values of mixed liquor in the aeration tank at various stages were measured. The results are shown in Table 4 below.

TABLE 4

| Solids content (wt %) of concentrated sludge on the basis of the solids content of sludge in aeration tank | SVI (ml/g) |
|---|---|
| 0 | 350 |
| 5 | 230 |
| 10 | 155 |
| 20 | 90 |

EXAMPLE 3

Example 2 was repeated except that the sludge concentrated to a solids content of 6.0% by weight in the atmospheric flotation concentrator and the separated water were directly returned to the aeration tank without using the roll press type dehydrator or mixing tank. The results are shown in Table 5 below.

TABLE 5

| Solids content (wt %) concentrated sludge on the basis of the solids content of sludge in aeration tank | SVI (ml/g) |
|---|---|
| 0 | 346 |
| 5 | 270 |
| 10 | 184 |
| 20 | 125 |

What is claimed is:

1. A method for improving the SVI of mixed liquor in the aeration tank of an activated sludge plant which includes said aeration tank and a sedimentation tank, which comprises the setps of:
   (a) introducing to a concentration line comprising a combination of an atmospheric flotation concentrator and a roll press type dehydrator, at least one component from the group consisting of mixed liquor in said aeration tank, mixed liquor drawn from a line connecting the aeration tank to a sedimentation tank and settled sludge flowing out of the sedimentation tank; thereby producing concentrated sludge having a solid content ranging from 4% to 12% by weight, wherein said atmospheric flotation concentrator includes (i) a foaming zone for blowing air under atmospheric pressure into a liquid phase containing a coagulant and a foaming agent, (ii) a mixing zone for mixing bubbles formed in the foaming zone with at least one component from the group consisting of the mixed liquor in the aeration tank, the mixed liquor drawn from a line connecting the aeration tank to the sedimentation tank and the settled sludge flowing out of the sedimentation tank, and (iii) a flotation tank for separating the mixture resulting in step (ii) into concentrated sludge and separated water, and further concentrating the concentrated sludge flowing out of said atmospheric flotation concentrator by said roll press dehydrator; and
   (b) returning said concentrated sludge and said separated water to said aeration tank.

2. A method according to claim 1 wherein the amount of solids being returned from said concentration line to said aeration tank is at least 5% of the amount of total solids in the mixed liquor in said aeration tank.

3. A method according to claim 1 wherein said coagulant is a cationic polymeric flocculant.

4. A method according to claim 1 wherein before returning the concentrated sludge and separated water in step (b), said concentrated sludge and separated water, as well as at least one from the group consisting of the settled sludge, mixed liquor in the aeration tank and mixed liquor drawn from a line connecting the aeration tank to the sedimentation tank are directed to a mixing tank, and at least part of the mixed sludge flowing out of the mixing tank is returned to the aeration tank.

5. A method according to claim 4 wherein said concentrated sludge has a solids content between 8 and 12% by weight.

6. A method according to claim 4 wherein the mixing tank is fed with only the concentrated sludge, separated water and settled sludge.

7. A method according to claim 4 wherein all of the mixed sludge flowing out of the mixing tank is returned to the aeration tank.

* * * * *